Patented June 14, 1932

1,863,429

UNITED STATES PATENT OFFICE

CHARLES B. WILLMORE, OF MASSENA, NEW YORK, ASSIGNOR TO ALUMINUM COMPANY OF AMERICA, OF PITTSBURGH, PENNSYLVANIA, A CORPORATION OF PENNSYLVANIA

BUS BAR JOINT

No Drawing.    Application filed November 18, 1929.   Serial No. 408,177.

This invention relates to the joining of metallic electrical conductors, such as bus-bars and the like, and particularly to the joining of conductors wherein the joints are of large cross sectional area.

As electrical installations are constantly increasing in capacity, it is necessary to provide increasingly larger bus-bars. The main desideratum in the joining of electrical conductors is the obtainment of a joint of low electrical resistance. Assuming that the surfaces of adjacent bus-bars in a joint contact perfectly throughout then, under the same conditions, if the area of contact is doubled, the electrical resistance of the joint would be halved, while if the area of contact were quadrupled the electrical resistance would be but one-fourth of the original resistance. In practice, however, because of imperfections in the contacting surfaces, such a mathematical ratio does not exist, and under the above-stated conditions the resistance is actually much more than one-half or one-quarter as the case may be.

The unduly large joint resistance naturally caused by imperfect joints between the conductor plates or bars is responsible for the loss of an appreciable amount of electrical energy, which is dissipated at the joint in the form of heat. This loss in energy increases as the joint becomes corroded and without some definite provision for exclusion of the atmosphere this corrosion takes place even under ordinary climatic conditions, and is further increased as moisture from the air deposits in the joint. Under these conditions an appreciable fraction of the total current passes through this aqueous film, and thus in addition to the ordinary atmospheric corrosion there also occurs a more rapid and destructive electrolytic corrosion. Therefore, under ordinary climatic conditions the electrical resistance of the joint increases over a period of years, and where the atmospheric conditions are abnormal the joint must often be reformed after a relatively short life.

The present invention has as an object the provision of electrical bus-bar joints in which the actual ratio between the total area of supposed contact and electrical resistance of contact approach more closely to the theoretically expected mathematical ratio of perfectly contacting surfaces.

A further object of the invention is the provision of a joint which will, over a period of years, increase but slowly over the initial electrical resistance value.

My invention is designed to increase the initial efficiency of bus-bar joints, to prolong their useful life and to render them less susceptible to corrosion, and the preferred practice of accomplishing these results is as follows. The surfaces to be joined are coated with a suitable unctuous substance such as vaseline which is chemically inert to atmospheric conditions. The coated surfaces are then abraded by the action of emery cloth, or the like, to remove any oxides or corrosion products originally adhering to the surface of commercial stock. The oil or grease may or may not be removed, and if removed, by superficially wiping the surfaces to remove the residue produced by the abrading agent, the oil or grease is immediately restored. This procedure maintains a continuous protecting film of oil or grease during and after the abrading operation, thus preventing reoxidation or corrosion of the prepared contacting surfaces.

On one of the prepared conductor surfaces, a plurality of small clean-surfaced metallic particles, which are preferably of a hardness somewhat greater than that of the conductor bars or plates being joined, are evenly spread. The number of particles is so limited as not to completely or continuously cover the entire contact surface. The surfaces to be joined are then pressed together under considerable pressure with the result that the small metallic particles placed on one of the prepared contacting surfaces are partially embedded into each of the adjacent surfaces making up the joint. The bars or plates are held in this position by any suitable means such as bolts, clamps, welding or the like, so as to maintain at least in part the original pressure.

Equally good joints have been obtained by preparing a paste of oil or grease containing the clean-surfaced metallic particles, and spreading this paste over the contacting surfaces after the initial preparation step previously described. Also a definite, though inferior, beneficiation of the joint may be secured by placing these metal particles between the contacting surfaces before joining, even though the initial step of cleaning the surfaces has been omitted.

Joints prepared in this manner have several advantages heretofore not obtained. The initial resistance of the joint is lowered by the presence of the small metallic particles embedded in the bus-bar surface. Commercial conductor stock, such as rectangular bus-bar stock, frequently has a rough and uneven surface particularly toward the extremities or edges of the stock. It is difficult to place two such bars together so that their surfaces contact over a major portion of the possible contacting area. The presence of the fine particles between these surfaces provides a multiplicity of points of absolute contact over a major portion of the possible contacting area and compensates for the inherent roughness of the surface, thus lowering the initial resistance of the joint. The lowering of the initial resistance produces a larger differential between the initial and the critical resistance at which the joint must be reformed, thus increasing the life of the joint.

In forming the joint, improved results will be obtained if the small particles are incorporated therein without the additional use of oil or grease. However, the presence of the oil or grease is desirable as it fills up interstices which would otherwise occur, and thus offers a material resistance to the entrance and corrosive action of the atmosphere and adds to the ultimate life of the joint. Many oils or greases can be used for this purpose provided they do not adversely react chemically with the metal of the conductors, and are of a consistency which permits them to flow freely away from the immediately contacting portions of the contacting surfaces when the necessary pressure is applied. In the preferred practice of my invention, I have used an oil, chemically inert to the atmosphere, such as vaseline. As a further protection against corrosion, the edges of the joint may be coated with a mixture of red lead and linseed oil, or some similar substance which hardens and seals the joint against moisture.

Although my invention is applicable to joints between conductors of any metal, it has been found particularly suitable in the forming of joints between aluminum bus-bars. For so doing, it has been found that copper particles are well adapted for use between the contacting aluminum surfaces. These particles may take the form of copper filings, but I prefer to use small round copper balls or spheres. Copper, if coated with vaseline, will maintain a bright unoxidized surface over a long period. The metal is also harder than aluminum and possesses excellent conducting qualities. When in the form of spheres, the metal if not readily flattened by pressure and therefore readily penetrates into the aluminum bus-bars when the joint is placed under pressure. Such copper spheres may be obtained in a number of ways but I have found them easily obtained by mixing small copper oxide particles with five to six times their volume of fine carbon dust and heating this mixture in a crucible for some time at a temperature slightly higher than the melting point of copper. The oxide is thus reduced to copper particles which assume a spherical form. These spheres are separated from the carbon dust be screening and washing and are cleaned by suitable chemical means with the result that they are finally obtained with clean bright surfaces free from oxide or other non-conducting surface films. The proper size of these spheres may be controlled by choosing the correct size of copper oxide particles. I have found from experiment that the preferred size of spheres is such as will pass a screen of 10 to 28 mesh.

In a large number of tests in which ordinary joints between aluminum and aluminum, and aluminum and copper have been compared with similar joints prepared in accordance with my invention, it has been found that the initial resistance of my improved joint is always substantially lower than the resistance of the ordinary surface to surface contact. For instance, a joint prepared by abrading surfaces of several aluminum bus-bars and then placing these bars one above the other under a total pressure of 25,000 pounds had an initial resistance of 1.76 microhms per 100 square inches. A similar joint but with small copper particles distributed in a coating of vaseline between the contacting surfaces had, under a total pressure of 25,000 pounds, an initial resistance of 0.12 microhms per 100 square inches. At the end of seven months of exposure under ordinary climatic conditions, the first joint had developed a resistance of 2.24 microhms per 100 square inches while the joint prepared in accordance with the invention had a resistance of only 0.15 microhms.

Two joints prepared between alternate aluminum and copper bars, the one joint being formed by merely clamping the abraded surface of the bars together and the other being formed with copper particles in a coating of vaseline, placed between the contacting surfaces, gave similar results. The initial resistance of the joint prepared according to the invention was 0.14 microhms per 100 square inches and increased after seven months to only 0.18 microhms per 100 square inches. In these examples, measurements were made under a total pressure of 25,000 pounds. An increase in pressure serves merely to force the contacting surfaces closer together and to decrease the resistivity of the joint.

Although in describing the invention mention has been made of particular metals in a certain application, it will be apparent that the mechanical construction of my new joint is such as is well adapted to the joining of any metallic conductor under conditions where electrical contact must be made between adjoining surfaces of considerable area.

What I claim is:

1. In a method of forming a joint of low initial electrical resistance between electrical conductors, the steps comprising coating the contacting surfaces with a layer of unctuous substance and placing between said coated surfaces a plurality of small conducting particles.

2. In a method of forming a joint of low initial electrical resistance between electrical conductors, the steps comprising coating the contacting surfaces of the conductors with a layer of an unctuous substance and placing on said coated surfaces a plurality of small metallic particles having a hardness at least equal to the hardness of the said conductors.

3. A method of forming joints of low initial resistance between a plurality of electrical conductors comprising coating the contacting surfaces with a layer of an unctuous substance, placing upon said coated surfaces a plurality of small metallic particles of a hardness at least equal to the hardness of the said conductors, superimposing the conductors one upon the other in suitable alignment, and exerting an external pressure on the said conductors to bring their contacting surfaces closely together.

4. A method of forming joints of low initial resistance between a plurality of electrical conductors comprising coating the contacting surfaces with a layer of an unctuous substance, abrading said coated surfaces, placing upon said coated surfaces a plurality of small metallic particles of a hardness at least equal to the hardness of the said conductors, superimposing the conductors one upon the other in suitable alignment, and exerting an external pressure on the said conductors to bring their contacting surfaces closely together.

5. A method of forming joints of low electrical resistance between a plurality of aluminum bus-bars comprising coating the contacting surfaces with an unctuous substance, placing on said surfaces a plurality of small copper spheres, superimposing said bus-bars one upon the other in proper alignment, and exerting upon said bars an external pressure of sufficient force to produce contact between substantial proportions of the adjacent joining surfaces.

6. A method of forming joints of low electrical resistance between a plurality of aluminum bus-bars comprising coating the contacting surfaces with an unctuous substance, abrading the coated surfaces, placing on said surfaces a plurality of small copper spheres, superimposing said bus-bars one upon the other in proper alignment, and exerting upon said bars an external pressure of sufficient force to produce contact between substantial proportions of the adjacent joining surfaces.

CHARLES B. WILLMORE.